United States Patent [19]

Ozeki

[11] Patent Number: 4,533,049
[45] Date of Patent: Aug. 6, 1985

[54] SLIDE FILE SHEET
[75] Inventor: Jiro Ozeki, Tokyo, Japan
[73] Assignee: Slidex Corporation, Tokyo, Japan
[21] Appl. No.: 586,731
[22] Filed: Mar. 6, 1984
[30] Foreign Application Priority Data
  Apr. 9, 1983 [JP] Japan ................................ 58-61548
[51] Int. Cl.³ .......................... B65D 85/48; B65D 1/36
[52] U.S. Cl. ................................. 206/455; 206/564; 206/472
[58] Field of Search ............... 206/455, 456, 454, 564, 206/472

[56]      References Cited
      U.S. PATENT DOCUMENTS

| | | | |
|---|---|---|---|
| 2,968,882 | 1/1961 | Ozeki | 206/456 |
| 3,913,740 | 10/1975 | Bisberg | 206/454 |
| 4,207,980 | 6/1980 | Namiki | 206/564 |
| 4,426,000 | 1/1984 | Dunn | 206/455 |

Primary Examiner—William T. Dixson, Jr.
Attorney, Agent, or Firm—Fleit, Jacobson, Cohn & Price

[57]      ABSTRACT

A slide file sheet includes a film holding plate having a plurality of rectangular recesses aligned with each other in rows and columns, frame supports for retaining frames of slide films in the respective rectangular recesses and protrusions provided at corners of the rectangular recesses of the plate to keep the slide films received in the recesses away from the bottoms of the recesses. According to the invention, the slide file sheet comprises a flexible cover attached at its one side edge to one side edge of the film holding plate to cover one surfaces and/or emulsion layer surfaces of slide films so as to securely protect them from dirt, fingerprints, scratches and the like, thereby facilitating handling the slide file sheet and always obtaining clear projected images of the films without any troublesome scraping operation.

13 Claims, 7 Drawing Figures

FIG_1
PRIOR ART

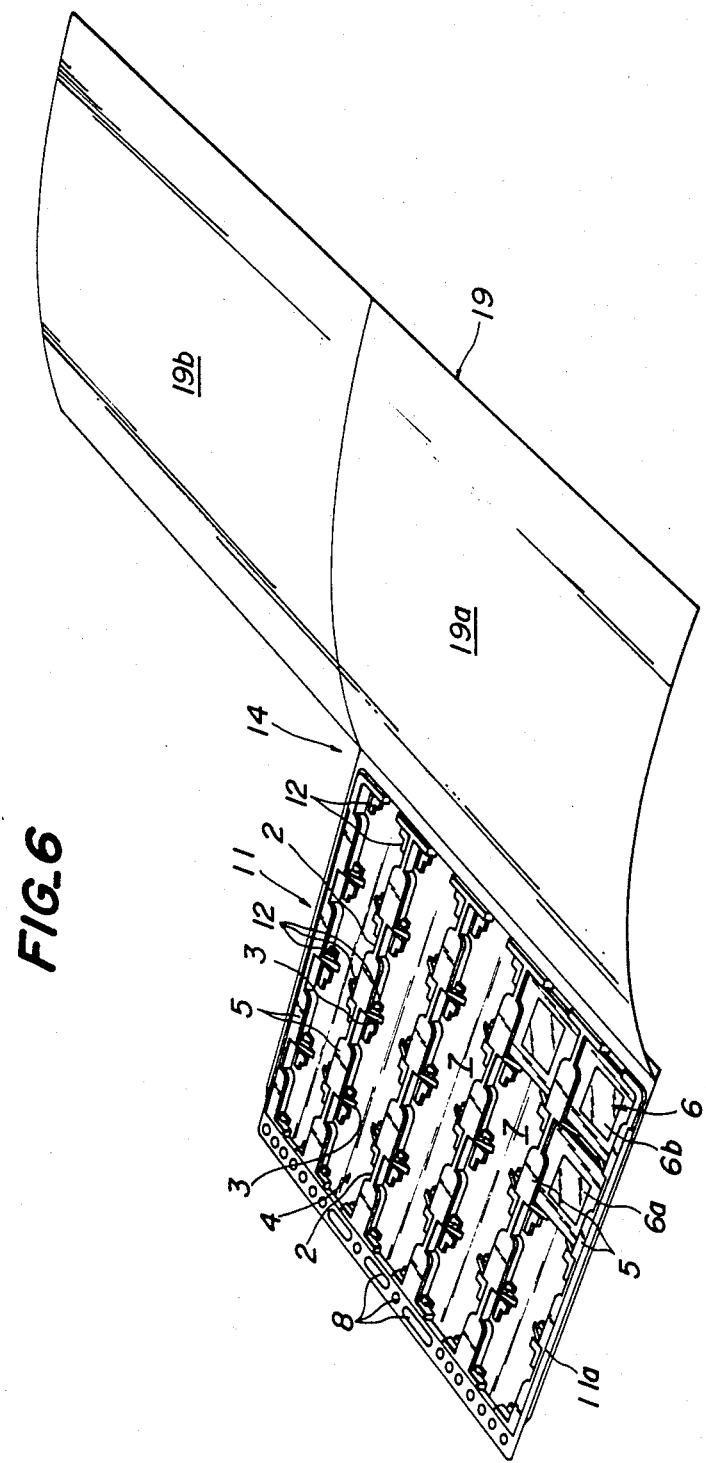

SLIDE FILE SHEET

BACKGROUND OF THE INVENTION

1. Field of the Invention

This invention relates to a slide file sheet, and more particularly to a slide file sheet for holding slide films with frames in its plurality of rectangular recesses for protecting them from dirt, fingerprint or the like.

2. Description of the Prior Art

There has been proposed a slide file sheet of this kind, for example, shown in FIG. 1. The slide file sheet of this kind consists of a film holding plate made of a rectangular plastic sheet which is transparent or opaque, in other words, light diffuse transmissible. The film holding plate comprises a plurality of rectangular recesses 4 formed by a plurality of continuous traverse ridges 2 traversely extending and spaced apart at an interval and longitudinal ridges 3 intermittently longitudinally extending and intersecting with the traverse ridges 2, and holding plates 5 extending inwardly of the rectangular recesses 4 from sides of the recesses, in this case, sides of the traverse ridges 2.

With this slide file sheet 1, slide films 6 with frames are pushed at front ends of the holding plates 5 into the rectangular recesses 4 in a direction shown by an arrow A until the frames 6a are embraced by the holding plates 5 against bottom walls 7 to snugly hold the slide films 6 in alignment with each other in rows and columns.

The slide file sheet 1 is formed, for example, in one side, with binding apertures 8 through which fastening fittings are engaged, thereby making it possible to bind a plurality of the slide file sheets like an album. Otherwise, hanging bars are secured to the slide file sheets with the aid of the binding apertures 8 or the like and then hung on hanger rails in a drawer of a cabinet, so that a great number of slide films can be effectively arranged and preserved. On the other hand, the slide film sheet 1 holding the slide films 6 therein is horizontally mounted on an overhead type projector so as to enable the slide films 6 selected according to a demand to be projected on a screen.

In this manner, the slide file sheets of this kind make it possible to arrange and preserve the slide films easily and rapidly without directly touching the slide films 6.

The slide file sheet of the prior art, however, only consists of a film holding plate only composed of a plurality of the rectangular recesses 4 having the bottom walls 7, and the holding plates 5 extending inwardly of the rectangular recesses 4, so that surfaces of the slide films 6 held in the rectangular recesses 4 are not prevented from dirt, fingerprint or the like, although the other emulsion layer surfaces of the slide films are sufficiently protected by the bottom walls 7 in contact therewith.

In order to obtain clear images projected on a screen at all times, therefore, it is necessary to handle the slide film sheets most carefully so as to avoid the dirt and fingerprint on the emulsion layer surfaces of the slide films. In fact, the slide file sheets are usually left on a desk for several hours and often for several days. In handling the slide file sheets bound like an album, moreover, fingers of users frequently contact the surfaces of the slide films unintentionally. In these cases, therefore, it is obliged to remove or erase the dirt and fingerprint from the surfaces of the slide films by gauze containing a small amount of water or alcohol. Furthermore, the above handling or treatment of the slide films often causes scratches or cuts in the surfaces of the slide films to spoil the valuable slide films. Such problems are particularly acute in other file sheets formed with opening at centers of the bottom walls 7 of the rectangular recesses 4 in opposition to positives of the films received therein.

SUMMARY OF THE INVENTION

It is a principal object of the invention to provide an improved slide file sheet which effectively solves the above mentioned problems of the prior art by eliminating its disadvantages.

It is a further object of the invention to provide an improved slide file sheet provided with a cover attached to one side edge of the film holding plate to cover one surfaces and/or emulsion layer surfaces of slide films so as to securely protect them from dirt, fingerprints, scratches and the like, thereby facilitating handling the slide file sheet and always obtaining clear projected images of the films by simply rolling the cover without any troublesome scraping operation.

In order to achieve these objects a slide file sheet including a film holding plate having a plurality of rectangular recesses aligned with each other in rows and columns, frame supports for retaining frames of slide films in said respective rectangular recesses and separating means for preventing said slide films from directly containing respective bottoms of said rectangular recesses of the plate according to the invention, comprises a flexible cover attached at its one side edge to one side edge of said film holding plate.

The invention will be more fully understood by referring to the following detailed specification and claims taken in connection with the appended drawings.

BRIEF DESCRIPTION OF THE DRAWINGS

FIG. 6 is another embodiment of the cover as shown in FIG. 7.

DETAILED DESCRIPTION OF THE PREFERRED EMBODIMENT

Figure 1:
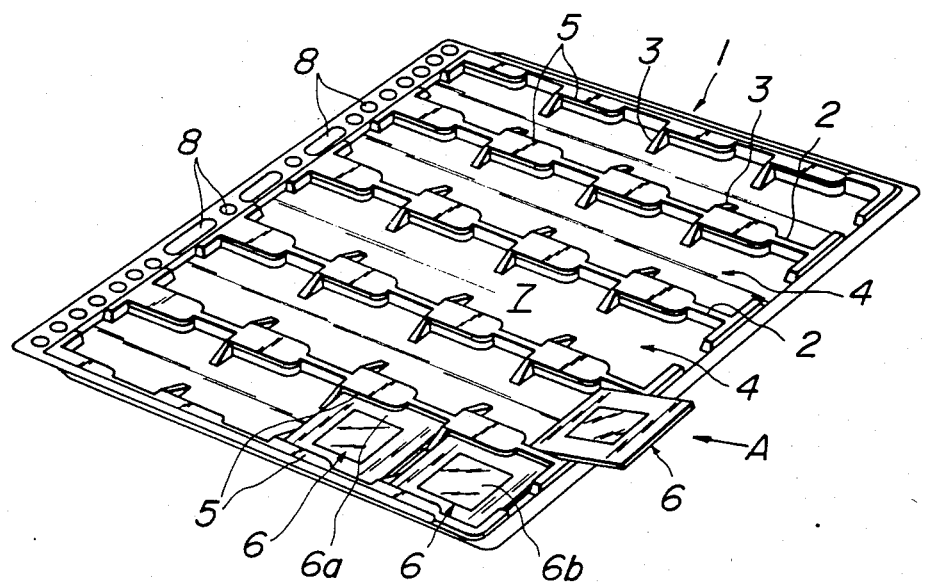
FIG. 1 is a perspective view illustrating a slide file sheet of the prior art.
Figure 2:
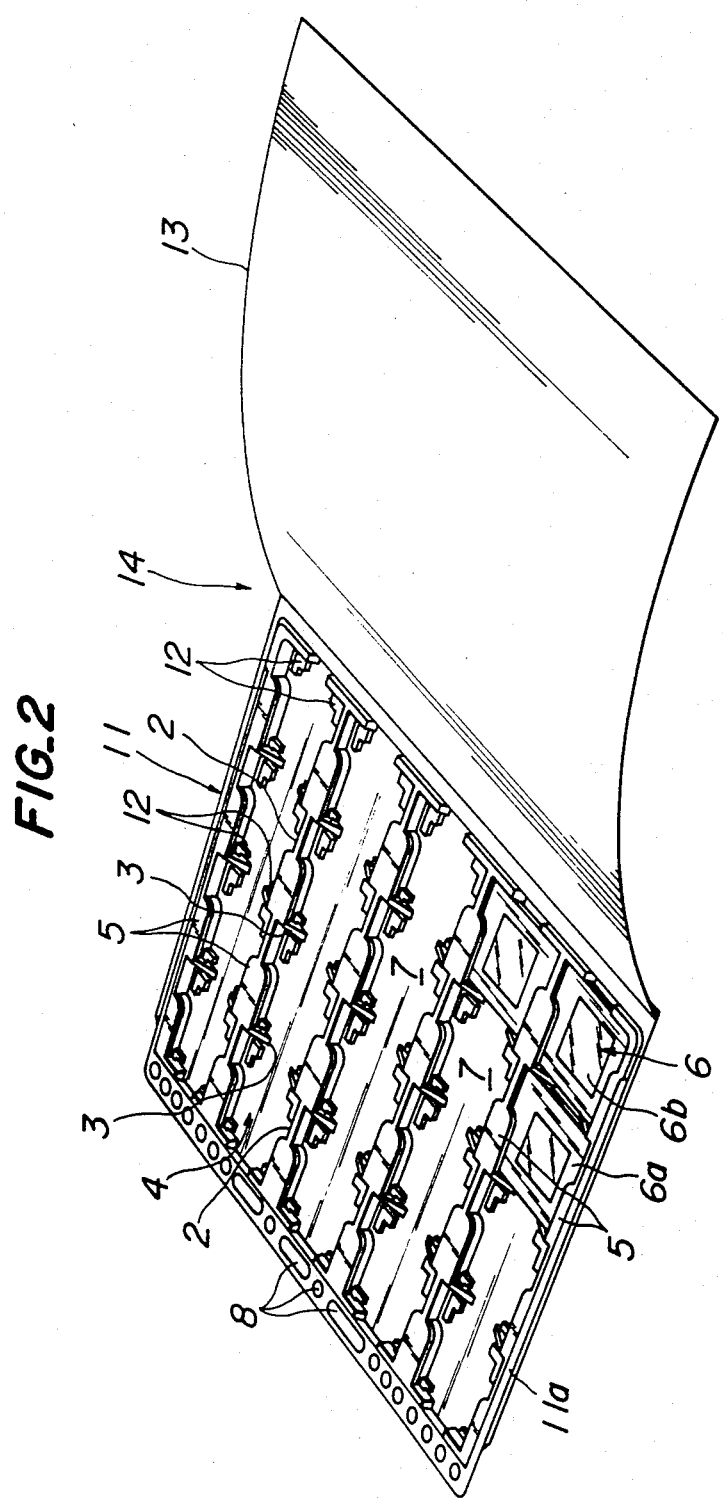
FIG. 2 is one embodiment of the slide file sheet according to the invention.

Referring to FIG. 2 perspectively illustrating one embodiment of the slide file sheet according to the invention, wherein the same parts as in FIG. 1 have been identified by the same reference numerals, a transparent or diffuse transmissible film holding plate 11 comprises a plurality of rectangular recesses 4 defined by traverse ridges 2 and longitudinal ridges 3, and plural pairs of holding plates 5 extending from side walls of the recesses 4 inwardly thereof as in FIG. 1. Other than bottom walls 7, the rectangular recesses 4 are provided at their corners with frame supports 12 or protrusions upwardly extending from the bottom walls so as to support frames 6a of slide films 6 received in the recesses as above described away from the bottom walls.

In this manner according to the invention, the slide films 6 are sufficiently spaced apart from the bottom walls distinctly from the prior art as shown in FIG. 1, so that when the bottom walls of the file sheet are subjected to any external shock or force, the emulsion layer surfaces of the slide films are effectively protected from such a shock or force. In projecting images of the slide films being held in the file sheet, focal surfaces of the bottom walls 7 are completely out of a screen to effectively prevent the bottom walls from being projected on the screen irrespective of the bottom walls being transparent or light diffuse transmissible.

A transparent plastic cover 13 substantially the same in size as the film holding plate 11 is secured at one side edge to a side edge of the film holding plate 11 opposite to the side having binding apertures 8 by means of fastening, adhering or the like as shown in FIG. 2. Moreover, side edges of the plastic cover 13 perpendicular to the side edge fixed to the film holding plate 11 are preferably shorter than side edges of the film holding plate corresponding thereto so as to expose the binding apertures out of the plastic cover when closing the cover 13 on the film holding plate 11, thereby facilitating binding a plurality of the slide file sheets 14 by means of fastening fittings.

With the slide file sheets 14 constructed as above described, the film holding plate 11 is covered by the plastic cover 13 with the exception when projecting the slide films 6 or inserting into or removing the slide films out of the recesses of the plate, whereby the surfaces of the slide films 6 are completely protected from the dirt and fingerprint and being scratched. Moreover, as the plastic cover 13 is transparent, needed slide films can be easily found by looking at them covered by the plastic cover with the aid of light beams passing therethrough when looking up the particular slide films.

In projecting the slide films held in the slide file sheet 14 by an overhead type projector, the projection of the films can be easily effected by turning or rolling up the plastic cover in a direction in which the cover does not obstruct the projection of the films. The projected images are always clear and clean owing to the protection of the slide films 6 by the plastic cover 13.

Figure 3:
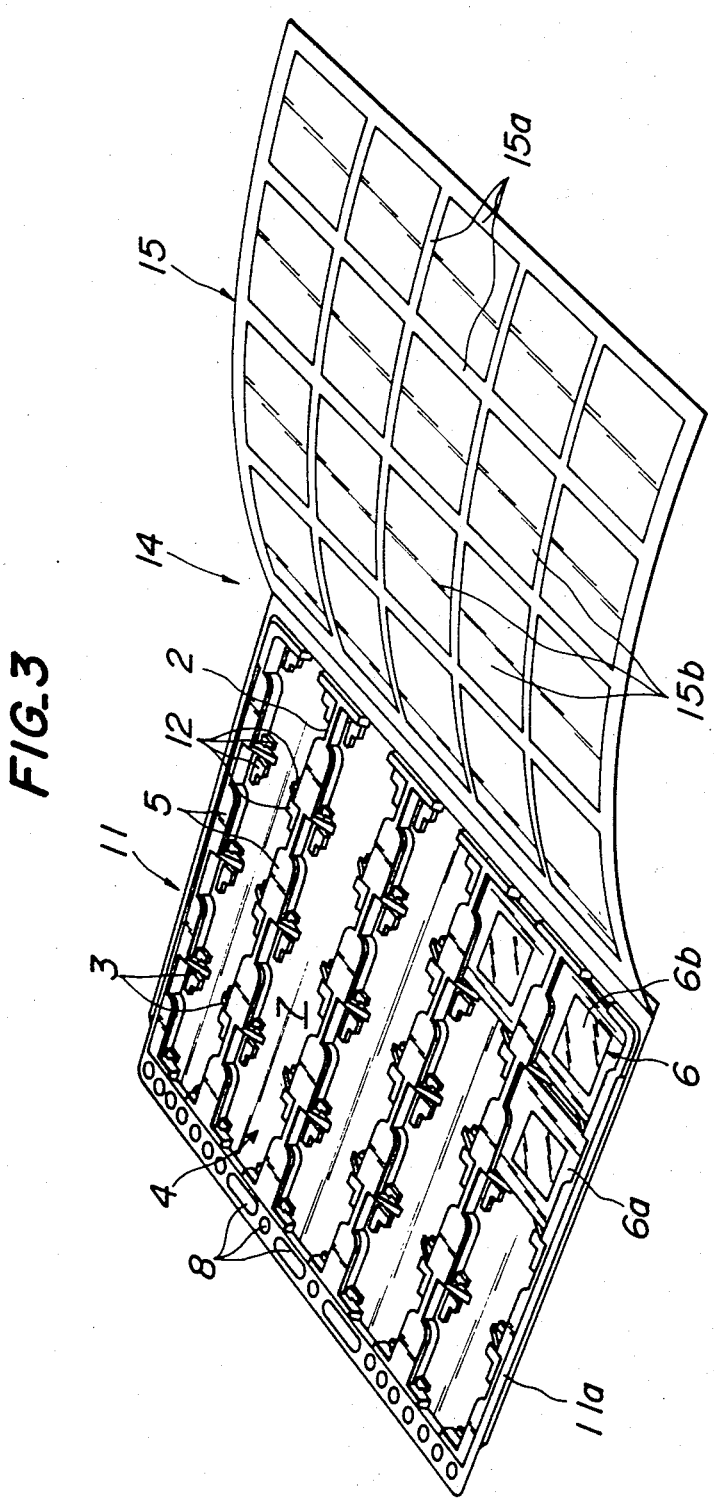
FIG. 3 is another embodiment of the slide file sheet according to the invention.

Referring to FIG. 3 illustrating a modification of the slide file sheet according to the invention, a plastic cover 15 is provided with opaque masking portions 15a in the form of a grid corresponding to traverse and longitudinal ridges 2 and 3 and peripheral ribs 11a of a film holding plate 11 in order to facilitate looking up needed slide films 6. The plastic cover 15 has transparent portions 15b corresponding to rectangular recesses to 4 of the film holding plate 11 to make it possible to find needed slide films held in the slide file sheet 14 by looking at them with the aid of light beams passing through the transparent portions 15b. In looking up the needed slide films, the masking portion 15b obstruct extra light beams passing at peripheries of the slide films 6 to make remarkably easy the looking up the needed slide films. It should of course be understood in this case that an area of the each transparent portion 15b can be reduced to an area corresponding to that of a picture area 6b of the each slide film 6 confined by a frame 6a. Moreover, the masking portions 15a in the form of a grid may be formed by opaque or printed tapes attached to the transparent cover 15. Surfaces of the tapes may be made coarse or rough to allow a user to write letters, characters or marks on the surfaces for memorandum.

Distinct from the embodiments shown in FIGS. 2 and 3, the plastic cover may of course be secured to the other side other than that having the binding apertures. Moreover, the plastic cover may be applied to the prior art slide file sheet having openings centrally formed in the bottom walls of respective rectangular recesses, which correspond in position and size to the picture zones of the films confined by frames, thereby also sufficiently protecting surfaces of the slide films opposite to the bottom walls of the rectangular recesses of the slide file sheet.

Figure 4:
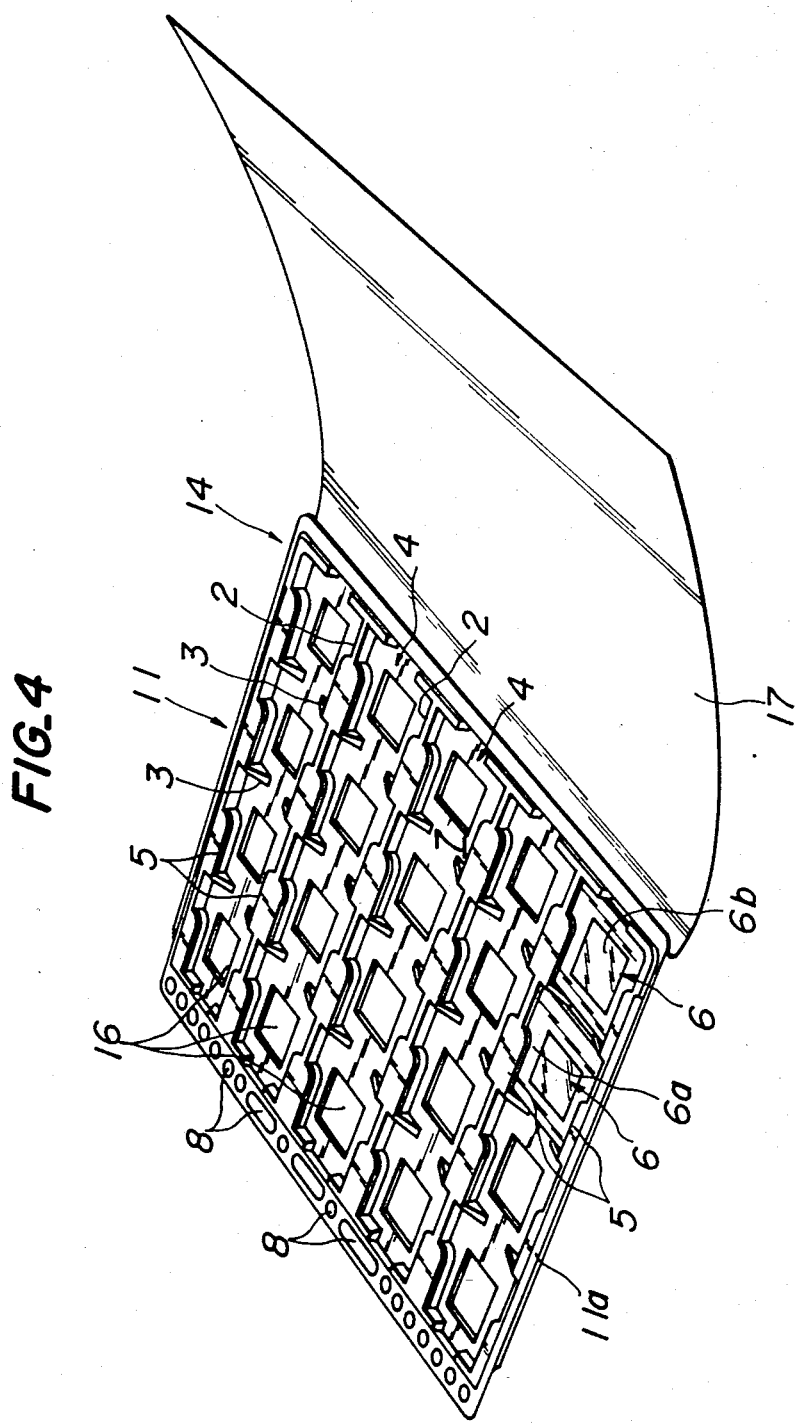
FIG. 4 is a further embodiment of the slide file sheet according to the invention capable of protecting emulsion layer surfaces of slide films.

As shown in FIG. 4, moreover, when a film holding plate 11 is formed with openings 16 in bottom walls 7 corresponding to picture zones of slide films, it is emulsion layer surfaces of the slide films rather than their opposite surfaces to be effectively protected from the dirt, fingerprint, scratch and the like. In view of this, a translucent cover 17 which is light diffuse transmissible is secured to a side edge of the film holding plate on its one side opposite to the surface opening the recesses protect the emulsion layer surfaces by covering the surface opposite to the recess opening surface of the film holding plate.

In this embodiment, moreover, the light diffuse transmissible cover is used, so that pictures on the films can clearly visually distinguished by looking at them with the aid of diffuse light beams passing through the slide file sheet 14 for looking up the needed films. Accordingly, the light diffuse transmissible cover 17 serves not only to protect the emulsion layer surfaces of the films 6 but also to facilitate the looking up the needed films.

In a more preferable embodiment of the invention, in addition to the diffuse transmissible cover 17, a plastic cover as shown in FIG. 2 or 3 is secured to one side edge of the film holding plate 11 on the side opening the rectangular recesses or the upper side as viewed in the drawings, so that these covers cover both the recess opening and opposite surfaces of the film holding plate to completely protect both the surfaces of the slide films 6. In projecting the slide films, these covers may be turned or rolled up in directions in which the covers do not obstruct the projection of the films as in the embodiments shown in FIGS. 2 and 3.

Figure 5:
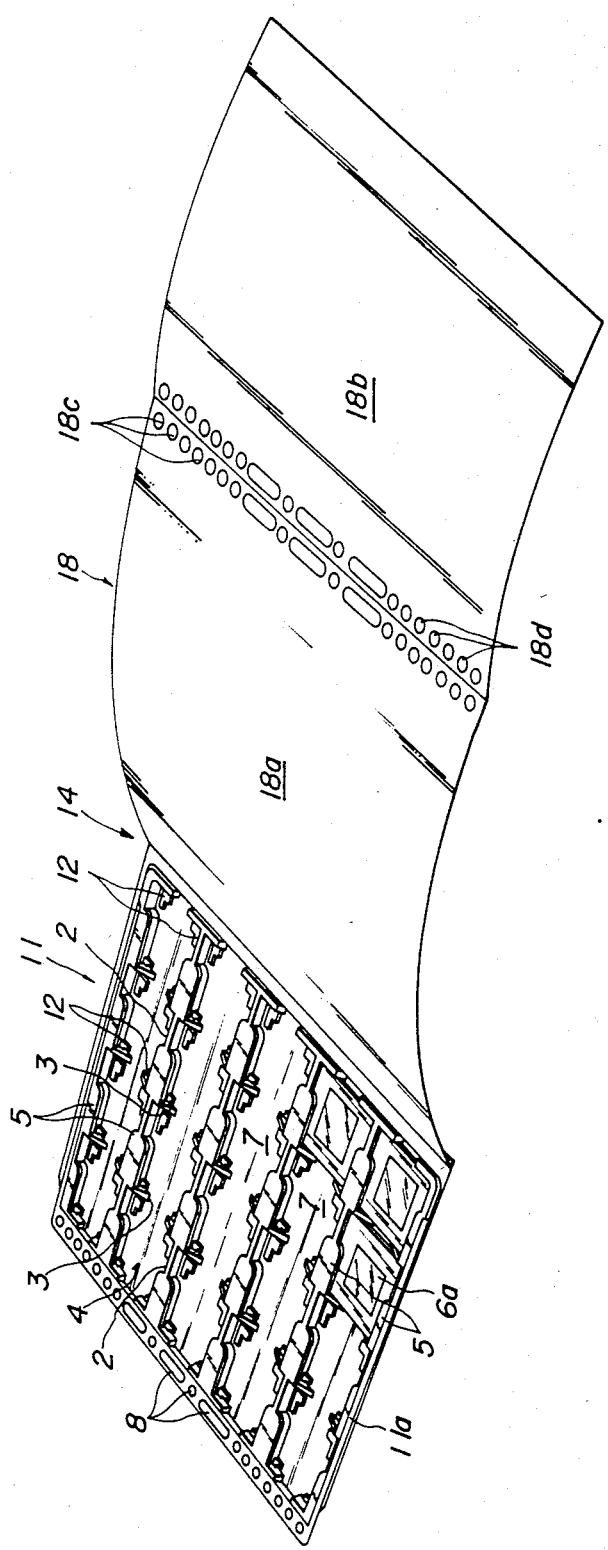
FIG. 5 is one embodiment of a cover used in the slide file sheet according to the invention covering both surfaces of its film holding plate.

In a further embodiment shown in FIG. 5, a film holding plate 11 is made transparent and is provided with a cover 18 which is secured to one side edge on its recess opening side so as to cover both the recess openings and opposite surfaces of the film holding plate 11. This elongated cover 18 consists of two halves 18a and 18b, one of which 18a is transparent and near to the film holding plate for covering the recess opening surface, and the other of which 18b is diffuse transmissible and remote from the film holding plate for covering its opposite surface. These halves 18a and 18b are respectively formed with binding apertures 18c and 18d corresponding to the binding apertures 8 in the film holding plate 11.

The transparent cover half 18a serves to protect the film surfaces of the slide films 6 and the other diffuse transmissible cover half 18b serves to previously diffuse the light beams passing therethrough to facilitate the visual recognition of needed slide films when looking at them. Accordingly, the elongated cover 18 functions as the two covers above described. As an alternative, the same effect can be achieved by a cover 18 which is secured to a side edge of a film holding plate on the opposite side and whose one half 18b near to the film holding plate is diffuse transmissible for covering the surface opposite to the recess opening surface of the plate and the other half 18a remote from the plate is transparent for covering the recess opening surface of the plate.

Referring to FIG. 6 illustrating a modification of the film holding plate shown in FIG. 5, to one side edge of a film holding plate 11 on its recess opening side or on its upper surface as viewed in FIG. 6 is secured a cover 19 having a traverse dimension similar to those shown in FIGS. 2 and 3 but a longitudinal dimension twice of those shown in FIGS. 2 and 3. The half 19a secured to the film holding plate 11 is transparent and the remaining half 19b is diffuse transmissible.

With this embodiment, the cover 19 is folded onto the recess opening surface or upper surface of the film holding plate, and the diffuse transmissible half 19b is then folded over one edge of the film holding plate onto an opposite surface or lower surface as viewed in FIG. 6 to bring the same function and effect as those of the embodiment shown in FIG. 5. In preserving the slide file sheets 14 bound like an album, moreover, the cover 19 folded from the recess opening or upper surface onto the opposite or lower surface of the film holding plate securely prevents the dirt from adhering onto the top or side of the plates during their preservation in vertical positions. When a cover 19 is secured to a side edge of the plate on the lower surface, the half near to the plate is a diffuse transmissible half 19b and the remaining half is a transparent half 19a as above described.

The elongated covers referring to FIGS. 5 and 6 may of course be applied to the film holding plate 11 having openings in its bottom walls as shown in FIG. 4. In this case, the diffuse transmissible portions of the covers also serve to protect the films as above described.

As can be seen from the above description, according to the invention, the cover is attached to one side edge of the film holding plate to cover one surfaces and/or emulsion layer surfaces of slide films so as to securely protect them from dirt, fingerprints, scratches and the like, thereby facilitating handling the slide file sheet and always obtaining clear projected images of the films without any troublesome scraping operation. By using the diffuse transmissible cover or portion, moreover, it is possible to look up or previously view needed slide films very easily.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A slide file sheet comprising:
 a film holding plate having a plurality of rectangular recesses aligned with each other in rows and columns,
 frame supports for retaining frames of slide film in said respective rectangular recesses,
 separating means for preventing said slide films from directly contacting respective bottoms of said rectangular recesses of the plate, and
 a flexible cover being at least partially transparent and attached at its one side edge to one side edge of said film holding plate.

2. A slide file sheet as set forth in claim 1, wherein said separating means includes protrusions provided at corners of said rectangular recesses of said plate to keep said frames of slide film located in the recesses away from said bottoms of the recesses.

3. A slide file sheet as set forth in claim 1, wherein said cover is attached to said one side edge of said film holding plate on a surface of the film holding plate defining said rectangular recesses.

4. A slide file sheet as set forth in claim 1, wherein the width of said cover is smaller than the width of the film holding plate so as to expose binding apertures formed in another side edge of said holding plate located opposite to the side edge to which the cover is attached.

5. A slide file sheet as set forth in claim 1, wherein said cover is transparent.

6. A slide file sheet as set forth in claim 5, wherein said cover is provided with opaque masking portions in the form of a grid so as to permit remaining portions other than the opaque masking portions to be transparent respectively at least corresponding to picture zones of the slide films received in said rectangular recesses of the plate.

7. A slide file sheet as set forth in claim 6, wherein said transparent areas respectively correspond to the rectangular recesses of the plate.

8. A slide file sheet as set forth in claim 1, wherein said film holding plate is formed with openings in bottoms of said rectangular recesses corresponding to picture zones of slide films received in said recesses.

9. A slide file sheet as set forth in claim 1, wherein said cover is attached to said one side edge of said film holding plate on a side opposite to a surface of the film holding plate defining said rectangular recesses.

10. A slide file sheet as set forth in claim 1, wherein said cover consists of two halves respectively substantially the same in size as said film holding plate and closely arranged side by side and the one half is transparent for covering the surface of the film holding plate opening the rectangular recesses and the other half is diffuse transmissible for covering the opposite surface of the plate.

11. A slide file sheet as set forth in claim 10, wherein said transparent and diffuse transmissible halves are formed with binding apertures at locations corresponding to binding apertures formed in one side edge of said film holding plate when the halves cover both surfaces of the plate.

12. A slide file sheet as set forth in claim 10, wherein to said one side edge of the film holding plate is attached one side edge of said one half whose side edge opposite to said attached side edge continues to one side edge of said other half.

13. A slide file sheet as set forth in claim 10, wherein to said one side edge of the film holding plate is attached one side edge of said one half whose side edge perpendicular to said attached side edge continues to one side edge of said other half.

* * * * *